United States Patent [19]

Miller et al.

[11] 4,012,554

[45] Mar. 15, 1977

[54] SINGLE COATING RECORD SYSTEM-SOLVENT LOSS PRODUCES COLOR

[75] Inventors: Robert E. Miller; Robert W. Brown; Paul S. Phillips, Jr., all of Dayton, Ohio

[73] Assignee: NCR Corporation, Dayton, Ohio

[22] Filed: Dec. 12, 1974

[21] Appl. No.: 531,932

Related U.S. Application Data

[62] Division of Ser. No. 315,723, Dec. 15, 1972, abandoned, which is a division of Ser. No. 173,559, Aug. 20, 1971, abandoned.

[52] U.S. Cl. .................................. 428/327; 106/21; 106/22; 282/27.5; 427/150; 427/151; 428/307

[51] Int. Cl.[2] ...................... B32B 5/16; B32B 27/00

[58] Field of Search .................. 427/150, 151, 152; 282/27.5; 428/402, 403, 407, 913, 323, 326, 327, 307; 260/38, 33.6 R; 252/188.3 R, 316; 106/21, 22, 32

[56] References Cited

UNITED STATES PATENTS

| | | | |
|---|---|---|---|
| 3,202,533 | 8/1965 | Sachsel et al. | 427/213 |
| 3,427,180 | 2/1969 | Phillips, Jr. | 282/27.5 |
| 3,560,229 | 2/1971 | Farnham et al. | 106/21 |
| 3,627,581 | 12/1971 | Phillips, Jr. | 252/316 |

FOREIGN PATENTS OR APPLICATIONS

| | | | |
|---|---|---|---|
| 1,222,016 | 2/1971 | United Kingdom | 252/316 |

*Primary Examiner*—Marion E. McCamish
*Assistant Examiner*—Charles E. Lipsey
*Attorney, Agent, or Firm*—E. Frank McKinney

[57] ABSTRACT

A colorless liquid ink is provided which yields a distinctive marking color on exposure to normal environmental conditions of temperature and pressure as when used for writing on a sheet of plain paper. This ink may be encapsulated to give pressure-rupturable microcapsules. Autogenous, pressure-sensitive record materials are provided by incorporation of such microcapsules in or on sheets of paper for use singly or in manifold duplicating systems which respond to printing-pressures applied by un-inked printing members.

6 Claims, 2 Drawing Figures

SINGLE COATING RECORD SYSTEM-SOLVENT LOSS PRODUCES COLOR

Figure 1:
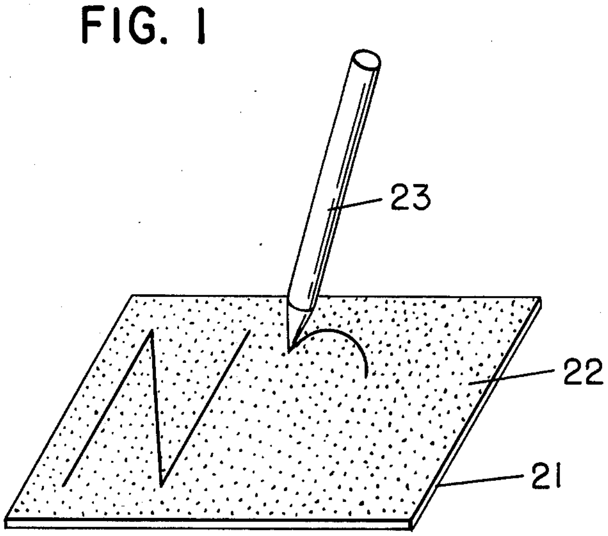

This is a division of application Ser. No. 315,723, filed Dec. 15, 1972, which is a division of Ser. No. 173,559, filed Aug. 20, 1971, both now abandoned.

This invention relates to an improved, colorless, liquid ink which yields a distinctive marking color on exposure to normal environmental conditions of temperature and pressure without the need of any exteriorly provided color forming reactants. The ink, which comprises colored dye, colorless dye precursor and color-developing reactant components in reaction equilibrium in solution in a volatile, liquid, solvent vehicle, exhibits a distinctive color when the vehicle evaporates. Further, this invention relates to isolated droplets of such an ink as may be provided by encapsulation of such droplets and to improved pressure-sensitive mark-forming record materials formed by coating papers with such encapsulated inks.

In the past, there have been provided pressure-sensitive mark-forming units and systems which comprise a colorless choromogenic component, generally present as a solute in a colorless liquid solvent which solution is the core material or internal phase of pressure-rupturable microcapsules, and a solid mark-forming component distributed in particulate form on a supporting sheet material, both components being arranged in proximate relation to each other, so that, upon the application of marking pressure to a capsule, the capsule ruptures and releases the liquid-carried chromogenic component. The consequent contact of the mark-forming components produces a mark or color in those areas where pressure is brought to bear. In the most practiced form, the prior units and systems have a micro-encapsulated solution of chromogenic material, such as Crystal Violet Lactone, (CVL), distributed as isolated liquid solution droplets on the underside of a supporting sheet, and a solid particulate material which is a color-developing material, coated on the face of an underlying sheet. Upon rupture of a number of capsules, a solution of chromogenic material migrates to the nearby color-forming reactant particles on the underlying sheet to produce a mark according to the rupture pattern. Also in other prior systems, the capsules and the color-forming reactant material could be arranged on a single sheet.

The pressure-sensitive mark-forming units and systems of this invention include similar chromogenic dyes and color-developing reactant materials, encapsulated or otherwise isolated from the environment, but in the systems of this invention all of the mark-forming components are in the same solution and may be contained in a single capsule wall. Rupture of such a capsule and release of its liquid contents to environmental exposure gives an immediate distinctive color by evaporation of the liquid vehicle. The encapsulated liquid ink of this invention may be used as part of a coating on sheets of paper for use singly or in stacked, manifold, copy systems. Such sheets are referred to as autogenous sheets because of their ability to produce distinctive, colored marks in response to printing pressures without the aid of inked printing members or exteriorly-provided color-forming reactants. Indeed the autogenous sheets of this invention derive this characteristic from the capsules of this invention which in the same sense may properly be called autogenous capsules.

Embodiments of this invention may be better understood by reference to the drawings.

FIG. 1 shows an autogenous record sheet comprising a supporting substrate web 21, such as a paper sheet, having adhesively bound on the upper surface thereof a coating that includes a random dispersion of the pressure-rupturable autogenous microcapsules 22 of this invention. A pressure-scribing member 23, such as a stylus, is shown in the process of breaking the pressure-rupturable microcapsules so as to release the contents of the capsules and allow the liquid contents thereof to escape and produce a distinctive color, by liquid vehicle evaporation, in the pressure-scribed areas.

Figure 2:
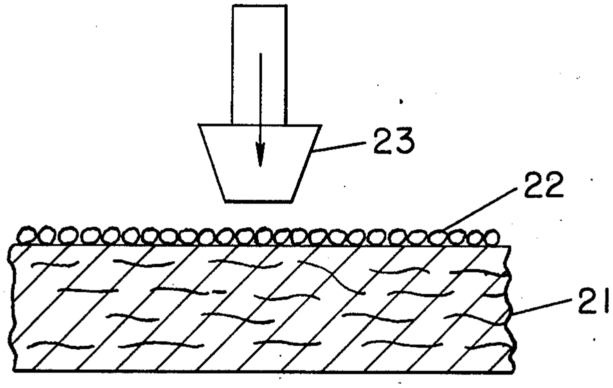

FIG. 2 is a greatly enlarged cross-sectional representation of the same autogenous record sheet shown in FIG. 1.

The coating is shown to include the autogenous microcapsules 22 of this invention but may also include various additives such as binding agents, opacifiers, pigments, toners and protective stilt material (micro-fine particulate material interspersed with the microcapsules to minimize accidental rupture of the microcapsules by frictional forces and static pressure forces encountered in handling and storing the coated record sheet material). The microcapsules 22 include an isolating wall of organic material and an internal phase of substantially colorless liquid ink comprising an organic liquid vehicle, a substantial portion of which readily vaporizes under normal conditions of temperature and pressure, and the following three components dissolved in the liquid vehicle in reactive chemical equilibrium with each other: a colorless chromogenic dye-precursor material, a colorless color-developing reactant material and the colored dye that results from the chemical reaction of the other two components. The nature and amounts of solvent vehicle and the components in equilibrium are chosen, as will be explained below, so that only a very minor amount of the colored dye is present (prior to capsule rupture) so that the liquid ink appears substantially un-colored to the human eye.

The use of the liquid ink of this invention as the internal phase of microcapsules allows many variations in use well known to printers, paper makers and other artisans. For instance, such autogenous capsules may be applied to the surface of any useful substrate, other than paper, where it is desired to have a distinctively colored mark appear in response to pressure. Plastic films readily lend themselves to such coatings. Similarly, the autogenous capsules of this invention may be used as a detection device as when applied to a key-hole or a walk-way to show the entrance of a key or the passage of a person. For use in association with paper, the capsules of this invention need not be applied to a surface of the paper but may be incorporated in a sheet at the time of its manufacture so as to be distributed throughout the thickness, or a part of the thickness, of a sheet. A sheet of paper may also be coated with these capsules on a single surface or on both surfaces. A sheet coated on a single surface may then be subjected to writing or printing pressure, on the coated surface, to give a right reading image of the pressure pattern, or on the uncoated surface to give a reverse reading image of the pressure pattern on the coated side of the sheet. In the latter instance the coated side may be superposed over a plain sheet of paper so that when the uncoated side is written on the sheet will act as a transfer sheet to give a right-reading copy of the written message on the underlying plain sheet of paper.

When a sheet is coated on both sides with the autogenous capsules of this invention it can be used both as a writing surface to receive a pressure-produced image and as a transfer sheet to make a copy of said image on an underlying surface.

The marking liquid of the present invention is an equilibrium solution which can be made up by dissolving both the active, color-producing, components in a liquid solvent vehicle. That is, when the materials of the above-described known art are used, chromogenic material, such as CVL, and color-developing reactant material, such as oil-soluble, acid-reacting phenol-aldehyde resin, are both dissolved in the same liquid vehicle to produce the colorless marking ink of this invention. Because the color-producing reactions of use in the present invention are equilibrium reactions, the dissolution of the two color-producing reactants in the same vehicle will immediately produce some colored dye product. Thus the marking ink of this invention comprises solvent vehicle, colorless chromogenic material, color-devloping reactant material and colored dye-product. The amounts of the materials used are chosen to make the amount of colored dye-product imperceptible to the human eye and to thereby make the ink colorless. Inasmuch as the equilibrium composition present in the ink solution can be approached from either side of the equilibrium reaction, the ink of this invention can alternatively be formed by dissolving a colored dye-product in the solvent vehicle provided the colored dye-product is the product of an equilibrium reaction between two colorless or nearly colorless starting materials.

The making of a dye solution wherein the color is imperceptible because of the dye's low concentration is not new and is not the point of novelty in this invention. The optical properties of such solutions are defined by Beer's Law which states that the optical density of the solution is dependent on the concentration of the solute (dye) in the solution. However, the concentration of dye solutions which are made up so dilute as to be colorless to the eye are generally also so dilute as to be useless as mark-forming solutions upon evaporation. Such dilute solutions have therefore not been previously used to make colorless inks that develop color on evaporation. This invention makes possible the use of dilute, colorless dye solutions for mark formation by the use of color-forming reactants which form their colored product by an equilibrium reaction. Such color-forming reactants can be put into solution to give an equilibrium solution wherein the concentration of the dye product is sufficiently low to be imperceptible in solution, but the total concentration of reactants plus dye product is sufficiently high to give a usefully distinctive mark after evaporation of the solvent. Evaporation of the volatile solvent vehicle is thought to cause the visible development of color in the ink by two simultaneously operating mechanisms. The already-formed colored dye, present in the equilibrium solution, becomes more strongly perceived as it becomes more concentrated (the Beer's law effect) and additional colored dye is formed during the evaporation (the Law of Mass Action effect).

Considerable variation in the rate of color development after capsule wall rupture is possible by a judicious selection of solvents and concentrations of reactants therein. Polar solvent materials which have unshared electron pairs have been found to compete with the colorless chromogenic material for association with the acidic color-developing material. Thus in a color-developing equilibrium reaction the presence of polar solvent molecules can prevent the development of perceptible amounts of color by the polar solvent molecules' competitively associating with the acid reactant material. Evaporation of the polar solvent after capsule rupture removes the competing polar solvent molecules and, by the Law of Mass Action effect, allows the color developing reaction to go quickly to completion. In this case there will be little or no visible color development during the evaporation of the solvent until such time as nearly all, say 90 percent or more, of the competing polar solvent material is evaporated and removed from the reaction site. If a more linear rate of development upon capsule rupture is desired, a non-polar solvent material may be chosen which gives relatively less competition with the color forming reaction in said reaction equilibrium. Thus, when only non-polar solvent molecules are present, competitive inhibition of the reaction is minimized. However, the capsule contents may appear colorless before capsule wall rupture mainly because of the dilution of the colored material by the non-polar solvent. Rupture of the capsule wall followed by evaporation of the non-polar solvent allows the colored material already present to become visible by concentration according to the Beer's Law effect. Even in the case of non-polar solvent materials, there appears to be additional colored material formed near the end of the evaporative process, by the Law of Mass Action effect, due to the removal of any competitive inhibition present and also due to the fact that the colored materials are commonly less soluble in the non-polar organic solvents than either of the reactants. Thus near the end of the evaporative process colored material will be precipitating out and will thereby drive the color-forming reaction to completion according to the Law of Mass Action effect.

As may be seen from the above description, the liquid ink of this invention shows no perceptible color before use and can be stored indefinitely in a closed container without developing perceptible color. Most usefully such storage in a colorless condition is effected by encapsulation of the colorless ink. The known art offers a wide choice of materials and methods for such encapsulation. The choice of wall material and encapsulating methods can be readily made by one schooled in the art from consideration of economy, intended use, and solvent vehicle to be encapsulated.

Non-polar solvents of use either singly or in combination as a solvent vehicle in this invention include aromatic hydrocarbons such as benzene, toluene, xylene, diethylbenzene, aliphatic hydrocarbons; and halogen derivatives of aliphatic and aromatic hydrocarbons. The preferred non-polar solvent is xylene.

Polar solvents of use, either singly or in combination, as a solvent vehicle in this invention include acetone and other ketones such as methyl-ethyl ketone, methyl-n-propyl ketone and trimethylnonanone; alcohols such as ethanol, propanol, butanol, octanol, and n-decyl alcohol; n-dibutyl ether and mixed alcohol-ethers such as methoxybutanol. The preferred polar solvent is methyl-ethyl ketone.

The solvent (or mixture of solvents) chosen must volatilize at least in part when exposed to the environmental conditions of use. The more rapidly the solvent volatilizes, the more rapidly the potential color of the colorless ink will develop and become visible. Rapid volatilization for the rapid appearance of a print is less critical for non-polar solvents. As pointed out above, considerable color will normally develop in non-polar solvent solutions long before the solvent evaporates completely. Therefore, if a "wet-ink" print, by which is meant one that never becomes dry, is desired the color-forming components of this invention may be dissolved in a mixture of solvents, a part of which is non-volatile, provided the non-volatile solvent is also non-polar. Thus a solution of Crystal Violet Lactone and a novolak resin may be dissolved in a mixed solvent comprising a volatile solvent such as xylene or acetone and a non-volatile solvent such as a chlorinated biphenyl or an alkylated biphenyl to give a "wet-ink" print which develops upon evaporation of the xylene or the acetone. The chlorinated or alkylated biphenyl under ambient conditions in temperate climates will generally remain unevaporated and will simply, when used on a paper surface, be held in position on the paper surface by imbibition on and in the paper fibers.

Colorless chromogenic compounds of use herein include the preferred Crystal Violet Lactone which is 3,3-bis-(p-dimethylaminophenyl)-6-dimethylaminophthalide and is commonly designated CVL, as well as "hexa-ethyl CVL" which is 3,3-bis-(p-diethylaminophenyl)-6-diethylaminophthalide, malachite green lactone which is 3,3-bis-(p-dimethylaminophenyl)phthalide, N-(p-nitrophenyl)rhodamine-betalactam and any of the many acid-colorable, basic, chromogenic dye-precursors, of which color-blocked triphenylmethane dyes ae the best known.

Color-developing reactant materials suitable for use with the chromogenic materials of this invention are organic acids, preferably phenols such as phenol, p-t-butylphenol, p-nitrophenol, m-diethylaminophenol, o-cyclohexylphenol, o-hydroxyphenol, p-hydroxyphenol, hexahydroxybenzene, pentachlorophenol, o-hydroxyacetophenone, p-hydroxyacetophenone, 5-methylresorcinol, 4-n-hexylresorcinol, 5-n-pentadecrylresorcinol, o-cresol, p-cresol, 1,2,4-xylenol, o-chloromercuriphenol, 3,5-diamylphenol, p-acetamidophenol, beta-napthol, 2,2'-dihydroxy-1, '-binaphthyl also known as beta-di-napthol, o-hydroxydiphenyl, p-hydroxydiphenyl, p-hydroxyazobenzene, phenolphthaleir, o-cresolphthalein, tetrabromophenolphthalein, thymolphthalein, non-crosslinked phenol-acetylene resins and phenol aldehyde resins such as novolaks, particularly para-substituted-phenol-formaldehyde resins and other acid-reacting phenol-aldehyde resins that are soluble in organic solvents, 1,1-bis-(4-hydroxy-3-methyl phenyl)cyclohexane, 2,2-bis-(4-hydroxy-3-methyl phenyl)butane, 4,4'-methylene-bis-(2-chlorophenol, 4,4'-methylene-bis-(2-pherylphenol), 4,4'-methylene-bis-(2-cyclohexylphenol), 4,4'-methylene-bis-(2-tertbutylphenol). Preferred is para-phenylphenol-formaldehyde resin.

The requirements set out above are sufficient to readily allow an artisan to practice this invention. Said requirements are:

1. that the color-forming reactants be colorless or nearly colorless,
2. that said reactants react reversibly by means of an acid-base reaction to produce a distinctively colored reaction product,
3. that said reactants and the colored reaction-product be dissolved in an inert, organic solvent, either polar or non-polar, to give an equilibrium solution at a concentration that appears to be colorless,
4. that said solvent must be at least in part evaporable, and
5. that said solution be protected to prevent evaporation, by containment, until such time as appreciable coloration therein is desired.

However, as one example of proportions that are useful in the practice of this invention, the following preferred specific example is given:

A colorless-ink solution was prepared by mixing 1 part by weight of Crystal Violet Lactone, 2 parts by weight of para-phenylphenol formaldehyde novolak resin and 97 parts by weight of xylene. This solution was colorless when made up fresh and remained colorless as long as it was contained so as to prevent solvent evaporation.

The above solution was encapsulated by the method taught and claimed in U.S. Pat. No. 3,533,958 which issued Oct. 13, 1970 on application of Isidore L. Yurkowitz. The encapsulated colorless ink was coated as an aqueous slurry on various substrates, including paper, polyethylene synthetic "paper" and plywood sheets. Binder materials, such as boiled starch and poly(vinyl alcohol), and protective stilt materials, such as alpha-cellulose floc fibers and un-gelatinized starch granules, were added where needed as is common in the art. In cases where the encapsulated colorless ink was desired as a free-flowing powder, the capsules were isolated by spray drying. The encapsulated colorless ink powder could be dusted on any surface, where it remained colorless until the capsule contents were released by pressure rupture of the capsule walls. On pressure release the surface area so-dusted turned an immediate and distinctive blue color.

In making up other useful colorless, chromogenic, inks from materials of the type set out above, the artisan may arrive at useful concentrations by small test-tube experiments. If the chosen amounts of the selected materials give an equilibrium solution that is perceptibly colored, additional solvent may be added to make the color imperceptible by dilution or competitive inhibition of color formation, or additional solvent plus one of the co-reactant materials may be added together so as to effectively decrease the concentration of the other co-reactant material.

What is claimed is:

1. In a record sheet material comprising a substrate sheet having adhesively bound on a surface a multiplicity of discrete, rupturable, microcapsules consisting essentially of capsule wall material and a liquid internal phase wherein said capsule wall material is organic polymeric film forming material and said internal phase is a substantially colorless ink which yields a distinctive marking color on exposure to color-developing conditions, wherein the improvement comprises an internal phase which is an equilibrium solution comprising a volatile organic solvent vehicle having dissolved therein colorless chromogenic material, color-developing reactant material, and the colored dye resulting from reaction between the chromogenic material and the color-developing reactant material.

2. The record sheet material of claim 1 wherein the capsule wall material is hydrophilic, the solvent vehicle is non-polar, the chromogenic material comprises Crystal Violet Lactone and the color-developing reactant material comprises an acidic phenolic material.

3. The record sheet material of claim 2 wherein the phenolic material is para-substituted-phenol-formaldehyde resin.

4. The record sheet material of claim 3 wherein the resin is para-phenylphenol-formaldehyde resin.

5. The record sheet material of claim 4 wherein the capsule wall material comprises gelatin.

6. The record sheet material of claim 5 wherein the organic solvent is chiefly xylene.

* * * * *